(12) United States Patent
Inoue et al.

(10) Patent No.: US 11,466,765 B2
(45) Date of Patent: Oct. 11, 2022

(54) LOCK-UP DEVICE OF TORQUE CONVERTER

(71) Applicant: VALEO KAPEC JAPAN KK, Atsugi (JP)

(72) Inventors: Atsushi Inoue, Atsugi (JP); Shintaro Ishizaka, Atsugi (JP)

(73) Assignee: VALEO KAPEC JAPAN KK, Atsugi (JP)

( * ) Notice: Subject to any disclaimer, the term of this patent is extended or adjusted under 35 U.S.C. 154(b) by 0 days.

(21) Appl. No.: 17/292,591

(22) PCT Filed: Nov. 8, 2019

(86) PCT No.: PCT/JP2019/043989
§ 371 (c)(1),
(2) Date: May 10, 2021

(87) PCT Pub. No.: WO2020/096054
PCT Pub. Date: May 14, 2020

(65) Prior Publication Data
US 2022/0003299 A1    Jan. 6, 2022

(30) Foreign Application Priority Data

Nov. 8, 2018  (JP) .............................. JP2018-210763
Sep. 4, 2019  (JP) .............................. JP2019-161371

(51) Int. Cl.
*F16H 45/02*    (2006.01)
*F16D 13/69*    (2006.01)

(52) U.S. Cl.
CPC .............. *F16H 45/02* (2013.01); *F16D 13/69* (2013.01); *F16H 2045/021* (2013.01); *F16H 2045/0284* (2013.01)

(58) Field of Classification Search
CPC ..... F16H 45/02; F16H 2045/0205–021; F16H 2045/0273–0294; F16D 13/69; F16D 25/06–0638
See application file for complete search history.

(56) References Cited

U.S. PATENT DOCUMENTS 3,446,323 A * 5/1969 Hilpert ................ F16D 25/0638
                                                           192/70.11
7,389,861 B2 * 6/2008 Ackermann ............ F16H 61/14
                                                           192/3.3
(Continued)

FOREIGN PATENT DOCUMENTS

DE       197 45 344 A1    4/1998
JP       2011-208791 A    10/2011
(Continued)

OTHER PUBLICATIONS

International Search Report dated Feb. 18, 2020 in PCT/JP2019/043989 filed on Nov. 8, 2019, 2 pages.
(Continued)

*Primary Examiner* — Ernesto A Suarez
*Assistant Examiner* — James J Taylor, II
(74) *Attorney, Agent, or Firm* — Oblon, McClelland, Maier & Neustadt, L.L.P.

(57) ABSTRACT

The lock-up device of a torque converter includes an input side clutch supporter fixed to a front cover for transmitting a power from a drive side; a plurality of clutch plates supported by the input side clutch supporter; a lock-up piston to pressurize the clutch plate to make the clutch connected; a piston guide supporting the end portion of the lock-up piston; a spring pack fixed to the lock-up piston, installed between the lock-up piston and the input side clutch supporter and including an elastic body that presses the lock-up piston in the direction of releasing the clutch;
(Continued)

and an mutual rotation prevention mechanism that prevents a relative rotation between the lock-up piston and the input side clutch supporter.

8 Claims, 8 Drawing Sheets

(56) References Cited

U.S. PATENT DOCUMENTS

| | | | |
|---|---|---|---|
| 10,378,615 B2* | 8/2019 | Jinnai | F16D 13/646 |
| 2018/0163794 A1* | 6/2018 | Deneszczuk | F16D 25/12 |
| 2018/0245643 A1* | 8/2018 | Caumartin | F16D 25/10 |
| 2019/0359049 A1* | 11/2019 | Wirachowski | B60K 6/48 |
| 2021/0215239 A1* | 7/2021 | Furuya | F16H 45/02 |
| 2022/0136593 A1* | 5/2022 | Ishikawa | F16D 13/52 |
| | | | 192/3.28 |

FOREIGN PATENT DOCUMENTS

| | | |
|---|---|---|
| JP | 2012-57694 A | 3/2012 |
| JP | 5414490 B2 | 2/2014 |

OTHER PUBLICATIONS

Extended European Search Report dated Jul. 8, 2022 issued in European Patent Application No. 19 882 190.2.

* cited by examiner

LOCK-UP DEVICE OF TORQUE CONVERTER

BACKGROUND OF THE INVENTION

(a) Field of the Invention

The present invention relates to a lock-up device of a hydraulic power transmission (a so-called torque converter) interposed between, for example, an engine crankshaft of a vehicle and an input shaft of a transmission.

(b) Description of the Related Art

In a torque converter assembled in a vehicle automatic transmission, a front cover constituting a front part of a converter housing is rotationally driven on a crankshaft, a torque is transmitted between blades on a pump impeller side of the converter housing and blades on a turbine runner side, and the torque is transmitted from the output shaft driven by the turbine runner to the input shaft of the transmission.

In addition, the torque converter operates a lock-up clutch by using a lock-up piston to promote fuel consumption and a lock-up device transmitting the torque of the crankshaft of the engine to the transmission through a torsion spring (an elastic body) for absorbing an impact (a torsional vibration).

Here, in order to speed up a response (separation) speed of the lock-up piston when the lock-up clutch operation is stopped, a spring pack with a built-in spring between the clutch support and the lock-up piston may be used.

For example, Patent Document 1 discloses a technical idea of installing a coil spring on an inner circumference side of an engaging portion in which a flange member installed on a piston member is protruded. According to this, it is shown that the piston member is pressed by the coil spring in the direction that the clutch is disengaged, which accelerates the response when the clutch is disconnected.

However, according to this technical idea, since the spring is mounted on the piston itself, it does not consist of an independent unit called a spring pack, and an assembly adjustment becomes difficult.

PRIOR ART

[Patent Document 1] Japan Patent No. Publication No. 5414490

SUMMARY OF THE INVENTION

The present invention to solve such a conventional art problem, as a lock-up device consisting of a lock-up clutch, a lock-up piston, an input side clutch support, etc., is to provide a lock-up device with excellent assemblability simultaneously reducing a mutual rotation between the lock-up piston and the input side clutch support, which simultaneously increases the response of the lock-up piston.

In order to solve such a problem, a lock-up device of a torque converter according to a first aspect of the present invention may be characterized to have:
   an input side clutch supporter fixed to a front cover for transmitting power from a drive side;
   a plurality of clutch plates supported by the input side clutch supporter;
   a lock-up piston to pressurize the clutch plate to make the clutch connected;
   a piston guide supporting the end portion of the lock-up piston;
   a spring pack fixed to the lock-up piston, installed between the lock-up piston and the input side clutch supporter, and including an elastic body that presses the lock-up piston in the direction of releasing the clutch; and
   a mutual rotation prevention mechanism that prevents a mutual rotation between the lock-up piston and the input side clutch supporter.

In this way, since the spring pack presses the lock-up piston in the direction of releasing the clutch, the response speed at the time of the clutch release is accelerated, and simultaneously, the mutual rotation of the lock-up piston and the input side clutch supporter generated during the rapid acceleration may be prevented by the mutual rotation prevention mechanism. In addition, since the spring pack is composed as an independent unit, it is possible to be assembled to the torque converter after being externally assembled and adjusted, which helps to improve efficiency such as a number reduction of an assembling adjustment process.

In addition, the lock-up device of the torque converter according to the second aspect of the present invention is the lock-up device of a first exemplary embodiment, and the spring pack may be characterized to have:
   a first retainer plate installed on the side of the lock-up piston and fixed with the lock-up piston;
   a second retainer plate installed to the input side clutch supporter side;
   a plurality of first spring supporters installed on a surface of the first retainer plate facing the second retainer plate;
   a plurality of second spring supporters installed on a surface of the second retainer plate facing the first retainer plate; and
   a plurality of coil springs supported by the first spring supporter and the second spring supporter.

In this way, after assembling the spring pack at the outside, it is possible to fix the first retainer plate to the lock-up piston by rivet combination and the effect of the number reduction of the assemble process described above is realized.

In addition, the lock-up device of the torque converter according to the third aspect of the present invention is the lock-up device of a second exemplary embodiment, and the mutual rotation prevention mechanism may be characterized to have:
   an outer gear installed on the exterior circumference of the first retainer plate of the spring pack; and
   an inner gear installed in the inner circumference of the input side clutch supporter close to the exterior circumference of the first retainer plate and engaged with the outer gear installed in the exterior circumference of the first retainer plate.

In this way, by a simple structure of the outer gear and the inner gear, the spring pack and the input side clutch supporter are free to move in the axis direction, but the mutual rotation is prevented, and therefore, the mutual rotation between the lock-up piston fixed to the spring pack and the input side clutch supporter is also prevented.

In addition, the lock-up device of the torque converter according to a fourth aspect of the present invention is the lock-up device of a second exemplary embodiment, and it may be characterized in that the exterior circumference portion of the second retainer plate has a shape that is bent toward the input side and is in contact with input side clutch supporter on the narrow surface.

Here, the narrow surface refers to contacting the exterior circumference portion of the second retainer plate by an L-shaped bent end or a Z-shaped bent small area, not the contact by the wide side without bending of the second retainer plate.

In this way, the spring pack may be mounted more compactly than when contacting on the wide surface, thereby reducing the entire space of the torque converter.

In addition, the lock-up device of the torque converter according to the fifth aspect of the present invention is the lock-up device of the second aspect, and it may be characterized in that a plurality of rivets for fixing the first retainer plate and the lock-up piston is included and the coil spring is not disposed near the fixing position of the rivet.

In this way, since the coil spring is not disposed near the rivet fixing position, the rivet fixing position may be close to the exterior circumference of the first retainer plate, thereby the first retainer plate may be down-sized, and also as the rivet fixing position and the spring position are close, the occurrence of a rotation moment or a bending stress may be reduced, and even pressure may be applied.

In addition, the lock-up device of the torque converter according to the sixth aspect of the present invention is the lock-up device of the first aspect, and it is characterized in that the exterior circumference portion of the lock-up piston is bent to the output side in the axis direction and is supported by the piston guide at that portion.

In this way, the exterior circumference of the lock-up piston may be reduced, and a larger torsion damper or pendulum may be installed on the outside of the lock-up piston while maintaining the entire size of the torque converter, and the entire size of the torque converter may be compacted if the torsion damper is used as in the conventional art.

In addition, in the lock-up piston, since the exterior circumference portion is supported by the piston guide with a bending structure on the bending surface thereof, it may avoid unintentional deformation of the lock-up piston, and it may have many effects such as maintaining good centering.

Further, as the lock-up device of the torque converter according to the seventh aspect of the present invention is the lock-up device of the second aspect, it may be characterized in that a plurality of hole portions installed to the first retainer plate as a part of the spring pack and a plurality of extrusion rivets of which a part of the lock-up piston is protruded in the spring pack direction are included, the extrusion rivet is capable of being inserted into the hole portion of the first retainer plate.

In other words, since a cylindrical rivet-shaped part (referred to as an extrusion rivet) is formed in a form of protruding the flat part of the lock-up piston at the same radius part at the axial center of the lock-up piston and the part as a rivet is inserted into the hole portion of the first retainer plate, the rivet as a separate member as described so far becomes unnecessary, and thus the structure may be simplified, the number of parts and the number of the assembling processes may be reduced, and further, the reduction in manufacturing cost may be expected.

In addition, the extrusion rivet part is integrally molded and does not have a rivet hole, which is a separate member, so there is no risk of liquid leakage from this part, and thus, the piston may be operated stably for a long time without deteriorated pressure.

It is also desirable to disable a movement in the axis direction by caulking the extrusion rivet head part (the part protruded from the first retainer plate).

However, without caulking the head part, it may be fixed by force-fitting or a spring force, or it may be moved in the axis direction. The stabilization in the axis direction may be maintained by a compressing spring force between the spring pack and the lock-up piston.

In addition, the lock-up device of the torque converter according to the eighth aspect of the present invention is a lock-up device of the seventh aspect, and it may be characterized that the coil spring is not disposed near the position of the extrusion rivet of the lock-up piston which is inserted into the hole portion of the first retainer plate.

In this way, as in the case of the fifth aspect, by not disposing the coil spring near the extrusion rivet position, the extrusion rivet position may be close to the exterior circumference of the first retainer plate, thereby down-sizing the first retainer plate, and in addition, as the extrusion rivet position and the spring position are close together, the occurrence of a rotation moment or bending stress may be reduced, and even pressure may be applied.

According to the present invention, it is possible to provide the lock-up device simultaneously having excellent assembly performance while reducing mutual rotation between the lock-up piston and the input side clutch supporter, which simultaneously increases the response of the lock-up piston in the lock-up device.

In addition, in the sixth aspect of the present invention, it is possible to provide the torque converter that may effectively utilize the outside of the lock-up piston exterior circumference portion.

DETAILED DESCRIPTION OF THE EMBODIMENTS

Hereinafter, a form for carrying out the present invention will be described with reference to the drawings. In addition, in the following, a range required for explanation for achieving the object of the present invention is schematically shown, and a range required for explanation of the corresponding part of the present invention is mainly described, and a part to which the description is omitted will be made by known technology.

Figure 1:
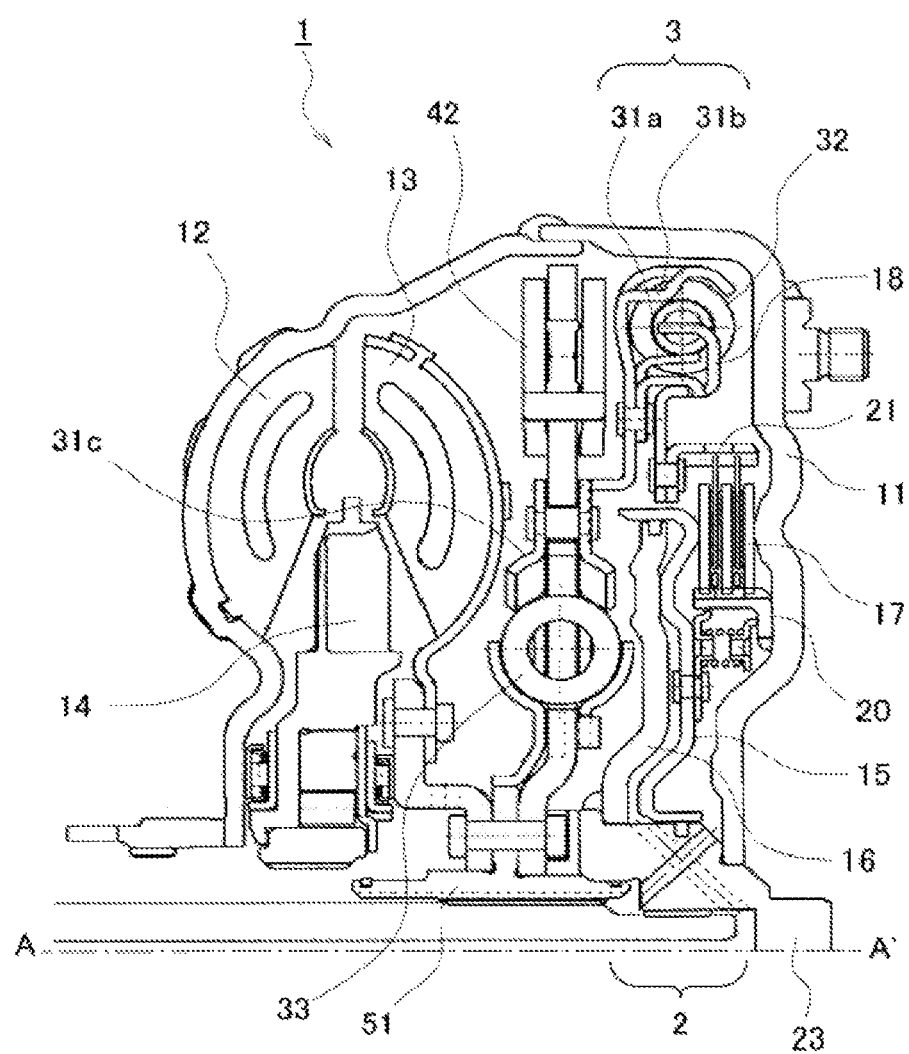
FIG. 1 is a longitudinal cross-sectional view of a torque converter including a lock-up device according to an exemplary embodiment of the present invention.
Figure 2:
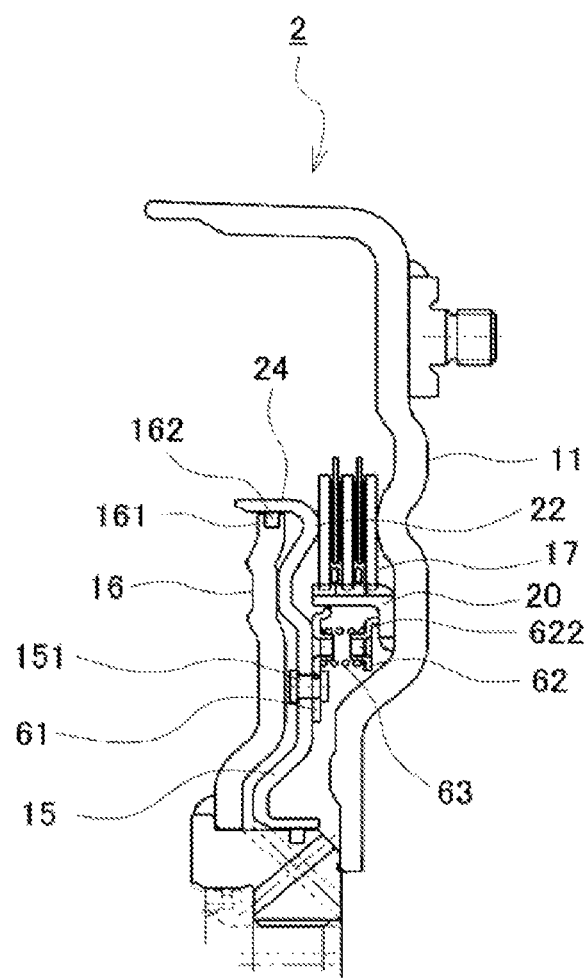
FIG. 2 is a top plan view of a lock-up device according to an exemplary embodiment of the present invention.

FIG. 1 is a longitudinal cross-sectional view of a torque converter including a lock-up device according to an exemplary embodiment of the present invention, in which an upper par is only shown and a lower part is omitted, and FIG. 2 is a top plan view of a lock-up device according to an exemplary embodiment of the present invention.

A torque converter 1 is a device for transmitting a torque from a crankshaft of an engine to an input shaft of a transmission. The engine that is not shown is disposed on the right side of the drawing, and the transmission that is not shown is disposed on the left side of the drawing. A-A' shown in the drawing is a rotation axis of the torque converter 1.

In addition, unless otherwise specified, the input side represents the right side of the drawing (front cover side), and the output side represents the left side of the drawing opposite to the input side. Also, the inside or inner circumference refers to the side closer to the rotation axis, and the outside or outer circumference refers to the side far from the rotation axis. Further, the axis direction is assumed to indicate the direction in which the rotation axis extends.

As shown in FIG. 1, a torque converter 1 mainly includes a front cover 11 and three type impellers (pump impellers) 12, a turbine runner 13, stator blades 14, a lock-up device 2, and a vibration absorption device 3 including members such as a retainer plate 31, an outer elastic member 32, an inner elastic member 33, a centrifugal pendulum 42, and a turbine hub 51 that receives power from the front cover 11.

Here, when the lock-up device 2 is not operating, the power from the front cover 11 is fluidly transmitted to the turbine hub 51 via the impeller.

On the other hand, when the lock-up device 2 is in operation, the power from the front cover 11 is transferred mechanically to the turbine hub 51.

The lock-up device 2 includes a lock-up clutch 17 made of a lock-up plate of a multi-layered plate disposed between the front cover 11 and the turbine hub 51, an input side clutch supporter 20 and an output side clutch supporter 21 supporting the lock-up clutch 17, a lock-up piston 15, a piston guide 16, a spring pack 60 installed between the lock-up piston 15 and the input side clutch supporter 20, and a drive plate 18 fixed and coupled to the output side clutch supporter 21.

The lock-up piston 15 is disposed inside the output side clutch supporter 21 between the front cover 11 and the vibration absorption device 3. The lock-up piston 15 is formed in an annular shape, and includes a pressing part 22 protruding on the input side.

In addition, the disk-shaped inner circumferential portion of the lock-up piston 15 is fixed to the cover hub 23, and the disk-shaped exterior circumference portion has a cylindrical edge portion 24 that is opened from the axis direction to the output side.

As above-described, if the exterior circumference portion of the lock-up piston 15 is bent in the axis direction output side and is supported to the piston guide 16 at that portion, the exterior circumference of the lock-up piston 15 may be reduced, and instruments such as a larger torsional damper and a pendulum may be installed on the outside of the lock-up piston 15 while maintaining the entire size of the torque converter 1, or if the torsion damper or the like is conventionally used, the entire size of the torque converter 1 may be compact.

In addition, the lock-up piston 15 is supported by the piston guide 16 on the bent surface with the structure in which the exterior circumference portion is bent, so that unintended deformation of the lock-up piston 15 may be avoided and a lot of effects such as a good maintenance of centering may be obtained.

In addition, around the central portion of the lock-up piston 15, six holes 151 for fixing rivets are installed evenly on the circumference.

The piston guide 16 is equally formed in an annular shape on the output side of the lock-up piston 15, the inner circumference side of the disk shape is firmly bonded to the cover hub 23, and the outer circumference portion of the disk shape is in contact with the inner surface side of the edge portion 24 of the lock-up piston 15 by interposing an O-ring 162 as a sealing member disposed on the recessed portion 161.

The lock-up piston 15 and piston guide 16 move in the axis direction input side by the pressure due to the internal oil of the torque converter 1. By this movement, the pressing part 22 presses the multi-layered plate clutch 17 and establishes a lock-up state.

Figure 3:
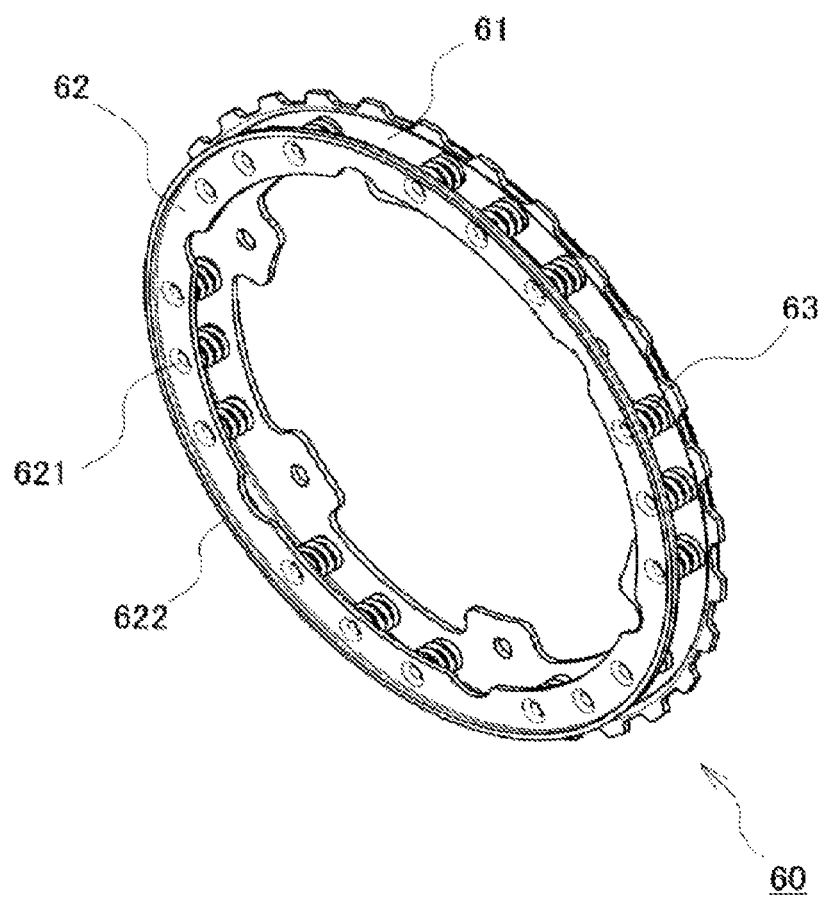
FIG. 3 is a perspective view of a spring pack of a lock-up device according to an exemplary embodiment of the present invention.
Figure 4:
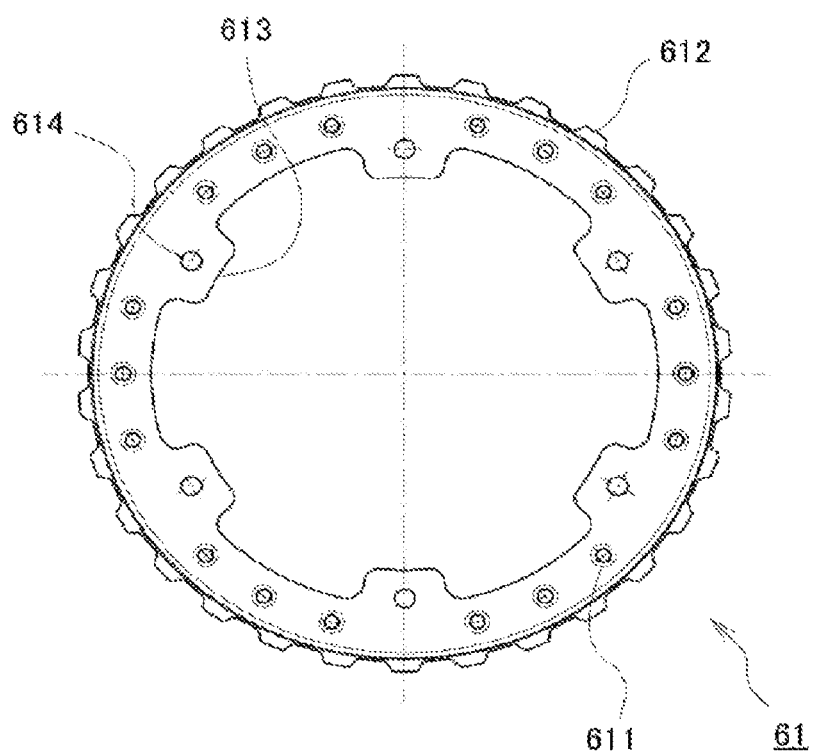
FIG. 4 is a top plan view of a first retainer plate of a device according to an exemplary embodiment of the present invention.
Figure 5:
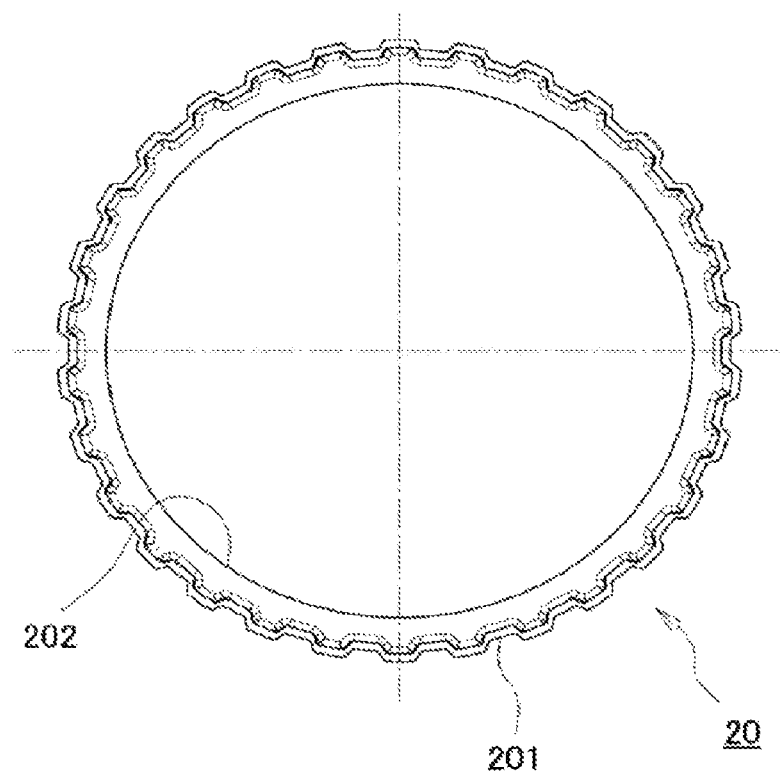
FIG. 5 is a top plan view of an input side clutch supporter of a device according to an exemplary embodiment of the present invention.
Figure 6:
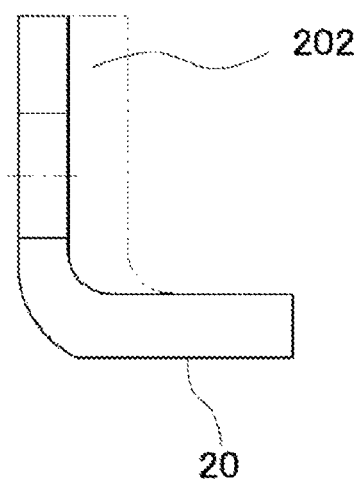
FIG. 6 is a longitudinal cross-sectional view of an input side clutch supporter of a device according to an exemplary embodiment of the present invention.

FIG. 3 is a perspective view of a spring pack of a lock-up device according to an exemplary embodiment of the present invention, FIG. 4 is a top plan view of a first retainer plate of a device according to an exemplary embodiment of the present invention, FIG. 5 is a top plan view of an input side clutch supporter of a device according to an exemplary embodiment of the present invention, and FIG. 6 is a longitudinal cross-sectional view of an input side clutch supporter of a device according to an exemplary embodiment of the present invention.

The spring pack 60 includes a first retainer plate 61 installed between the lock-up piston 15 and the input side clutch supporter 20 and fixed to the lock-up piston 15, a second retainer plate 62 installed at the input side clutch supporter 20 side, a plurality of first spring supporters 611 installed at the surface facing the second retainer plate 62 of the first retainer plate 61, a plurality of second spring supporters 621 installed at the surface facing the first retainer plate 61 of the second retainer plate 62, and a coil spring 63 sandwiched between the first spring supporter 611 and the second spring supporter 621.

The first retainer plate 61 has an approximate ring shape, and a thin plate shape, has a plurality of protruded portions, that is an external gear 612 on a most of the exterior circumference thereof, and has a plurality of first spring supporters 611 (18 in the present exemplary embodiment) formed by a burring process, and protruded to the second retainer plate 62 and fitted with the interior diameter of the coil spring.

In addition, the inner periphery of the first retainer plate 61 has six tongue portions 613 protruded inward, and the central portion thereof has a rivet fixing hole 614.

Also, the first spring supporter 611 is installed evenly on the circumference, but it is not installed where the tongue portion 613 is located. Therefore, the spring supporters 611 that must be installed in 24 places originally are formed in 18 places.

The reason is that if the first spring supporter 611 is installed in the place where the tongue portion 613 is located, the rivet hole 614 of the tongue portion 613 must be installed further inside and the size of the first retainer plate 61 increases, and in addition, if the first retainer plate 61 is fixed to the lock-up piston 15 with the rivet, there is a risk of generating unnecessary rotation moment or bending stress during the operation or releasing of the lock-up.

The second retainer plate 62 is formed by a burring process with an approximately ring shape, with a thin plate shape, and has a plurality of second spring supporters 621 (18 in the present exemplary embodiment) protruded to the first retainer plate 61 side and fitted with the interior diameter of the coil spring 63.

In addition, the outermost circumference of the second retainer plate 62 has an edge portion 622 that is bent with an L-shape on the input side in the axis direction and is in contact with the cylinder bottom of the input side clutch supporter 20 at the front end surface of the edge portion 622.

In addition, the second retainer plate 62 may not have the L-shaped edge portion 622 formed on the exterior circumference portion, but may have an L-shaped portion formed on the inner circumference, and in any case, it may be in contact with the front cover 11 rather than the input side clutch supporter 20.

Alternatively, the second retainer plate 62 may have a Z-shaped bend rather than the L-shaped bend, and it may be in contact with the input side clutch supporter 20 or the front cover 11 in the shorter plane.

In addition, the number of spring supporters, tongue portions, etc. until now is an example, and may be more or less than this, and it is effective depending on the degree.

The input side clutch supporter 20 is approximately cylindrical, and one bottom surface is bent to the inner circumference side and fixed to the front cover 11 at that part.

In addition, the external circumferential surface of the input side clutch supporter 20 is formed with an outer gear 201 to support the multi-layered plate clutch plate of the lock-up clutch 17, while the interior circumference of the input side clutch supporter 20 is formed with the inner gear 202 in a form that is shared with the outer gear 201 and is made to engage with the outer gear 612 of the first retainer plate 61.

Next, an assembly procedure of the lock-up device of an exemplary embodiment of the present invention will be described.

First, the first retainer plate 61 is horizontally disposed, so that the first spring supporter 611 faces upward, and is fit to the interior diameter of the coil spring 63 thereon.

Next, the second retainer plate 62 is mounted so that the second spring supporter 621 fits into the interior diameter of the coil spring 63. In this state, the partial assembly of the spring pack 60 is completed.

Then, the piston guide 16 and the lock-up piston 15 are mounted horizontally in this order.

In this state, the partially assembled spring pack 60 is mounted upwardly.

After that, the rivet hole 614 of the first retainer plate 61 of the spring pack 60 and the rivet hole 151 of the lock-up piston 15 are fixed with a rivet. Accordingly, the partial assembly of the lock-up device is completed.

In this way, since the assembling of the spring pack 60 may be performed independently in advance, the assembling work may be easily and accurately performed, and an effect of reducing the number of assembling processes may be obtained.

Next, the operation of the lock-up device according to an exemplary embodiment of the present invention is described.

When the lock-up piston 15 is hydraulically pressed in the direction of the lock-up clutch 17, the pressing part 22 causes the lock-up clutch 17 to be connected. As a result, the power from the front cover 11 is transmitted to the input side clutch supporter 20, the lock-up clutch 17, the output side clutch supporter 21, and the drive plate 18, and is also transmitted to the output side turbine hub 51 via an intermediate member.

At this time, if there is a sudden acceleration on the input side, there is a risk of a mutual rotation between the lock-up piston 15 and the input side clutch supporter 20 and the front cover 11 fixed thereto.

Even in such a state, since the outer gear 612 of the external circumferential surface of the first retainer plate 61 of the spring pack 60 fixed and coupled with the lock-up piston 15 and the inner gear 202 of the inner circumference side of the input side clutch supporter 20 are interlocked, the mutual rotation may be prevented.

In addition, when the connection with the lock-up clutch 17 is released, the lock-up piston 15 is separated by the elastic force of the coil spring 63 embedded in the spring pack 60, and the lock-up state is quickly released.

In addition, the fixing of the first retainer plate 61 of the spring pack 60 and the lock-up piston 15 is performed with a rivet, but since the rivet position is close to the position of the coil spring 63 in the radial direction, it is possible to reduce the occurrence of the rotation moment or the bending stress during the locking-up or releasing of the lock-up piston 15 and stable operation is possible.

Next, the lock-up device according to another exemplary embodiment of the present invention is described.

Figure 7:
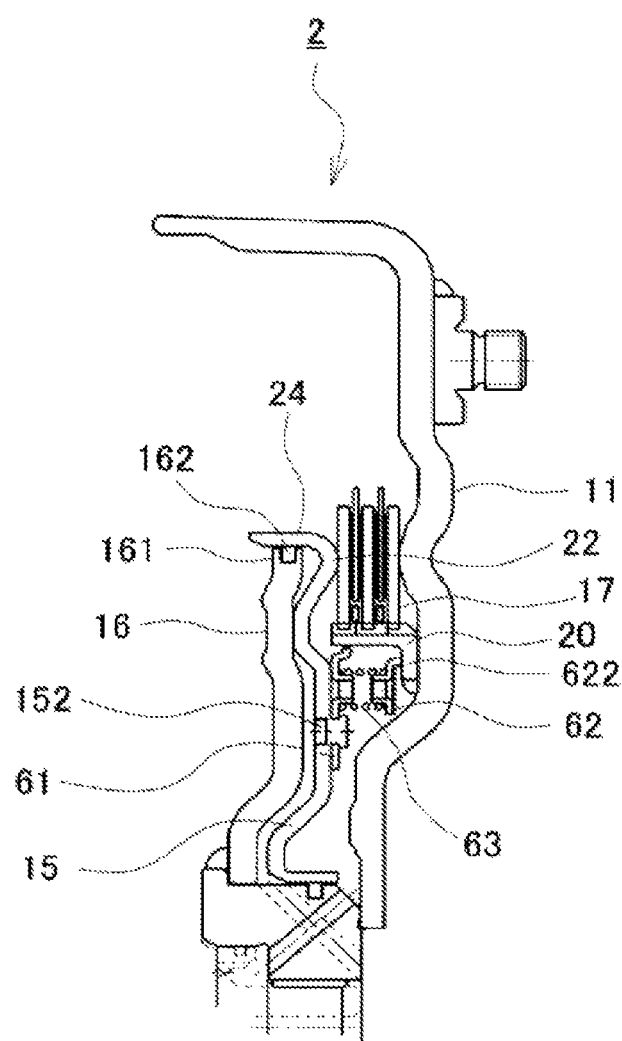
FIG. 7 is a top plan view of a lock-up device according to another exemplary embodiment of the present invention.

FIG. 7 is a top plan view of a lock-up device according to another exemplary embodiment of the present invention, which is a modification of some of the previous exemplary embodiment, and parts common to the previous exemplary embodiment are indicated by the same numbers and detailed description thereof is omitted.

In the central portion of the lock-up piston 15, 6 cylindrical extrusion rivets 152 are formed evenly on the circumference.

The extrusion rivet 152, also called an extruded rivet or a semi-pierced rivet, is formed in a rivet shape by extruding the flat part of the lock-up piston 15 in a cylindrical shape toward the spring pack 60 side, and the extrusion part is not penetrated. Therefore, the lock-up piston 15 has a structure without a hole portion.

On the other hand, the spring pack 60 has the same structure as described so far, and the first retainer plate 61 has 6 holes 614 with an interior diameter that is slightly larger than the exterior diameter of the extrusion rivet 152 in the location corresponding to the extrusion rivet 152.

In this state, the lock-up piston 15 and the first retainer plate 61 are fixed in the axis direction by caulking the protruded head portion of the extrusion rivet 152 in the state that the extrusion rivet 152 is inserted into the six holes 614.

The advantage of such a fixing method is that it is not necessary to prepare the rivet as a separate member, a member cost may be reduced, and even when assembling, the work such as inserting and a temporary fixing of the rivet is unnecessary, and the number of the work processes may be expected to be reduced.

In addition, since the lock-up piston 15 does not have a hole for fastening rivets, power transmission is efficiently performed without causing fluid leakage or a pressure deterioration.

Figure 8:
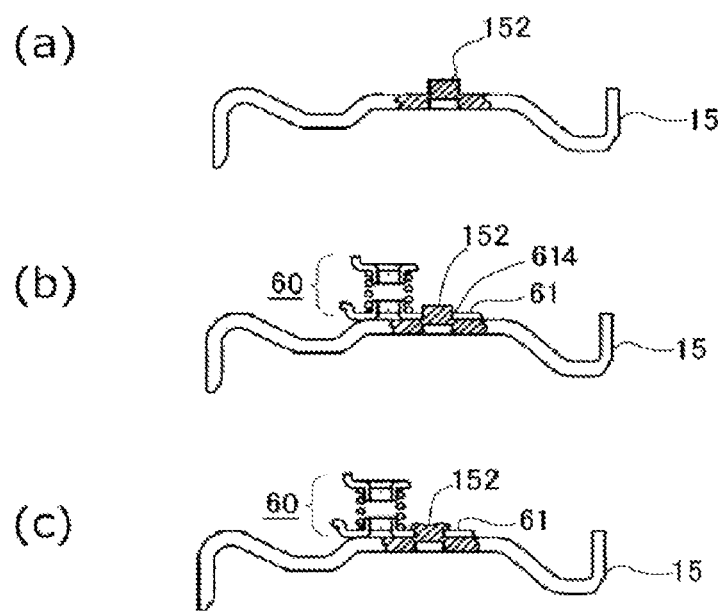
FIG. 8 is an explanatory diagram of a lock-up device according to another exemplary embodiment of the present invention.

Here, the assembly sequence of another exemplary embodiment of the present invention will be described. FIG. 8 is an explanatory diagram of a lock-up device according to another exemplary embodiment of the present invention.

First, partial assembling of the spring pack 60 is performed by mounting and fitting the coil spring 63 and the second retainer plate 62 to the first retainer plate 61 with 6 holes 614.

Meanwhile, six extrusion rivets 152 are formed on the lock-up piston 15 (FIG. 8(*a*)).

Next, the lock-up piston 15 is horizontally disposed, the spring pack 60 is lowered from above, and the extrusion rivet 152 is inserted into the hole 614 of the first retainer plate 61 (FIG. 8(*b*)).

Finally, the head portion that the extrusion rivet 152 is protruded is caulked (FIG. 8(*c*)). This completes the assembling of the lock-up device.

In addition, it is preferable to caulk the head portion of the extrusion rivet 152, but it may be force-fitted without caulking or may be loosely fitted.

In addition, the present invention is not limited to the above-described exemplary embodiment, but it is possible to perform various changes within a range that does not deviate from the gist of the present invention. These are all part of this technical idea.

As described above, the present invention is widely used in industry to improve the performance of torque converters of vehicles such as automobiles, and has high availability.

CODE DESCRIPTION

1 torque converter
2 lock-up device
11 front cover
15 lock-up piston
16 piston guide
17 lock-up clutch
20 input side clutch supporter
21 output side clutch supporter
23 cover hub
51 turbine hub
60 spring pack

What is claimed is:

1. A lock-up device of a torque converter, comprising:
   an input side clutch supporter fixed to a front cover for transmitting power from a drive side;
   a plurality of clutch plates supported by the input side clutch supporter;
   a lock-up piston to pressurize the clutch plates to make a clutch connected;
   a piston guide supporting an end portion of the lock-up piston;
   a spring pack fixed to the lock-up piston, installed between the lock-up piston and the input side clutch supporter, the spring pack including:
   a first retainer plate installed on a side of the lock-up piston and fixed with the lock-up piston,
   a second retainer plate installed on a side of the input side clutch supporter, and
   an elastic body between the first retainer plate and the second retainer plate that presses the lock-up piston in a direction of releasing the clutch; and
   a relative rotation prevention mechanism that prevents relative rotation between the lock-up piston and the input side clutch supporter, the relative rotation prevention mechanism including:
   an outer gear on an exterior circumference of the first retainer plate of the spring pack, and
   an inner gear on an inner circumference of the input side clutch supporter and engaged with the outer gear.

2. The lock-up device of the torque converter of claim 1, wherein
   the spring pack includes:
   a plurality of first spring supporters installed on a surface of the first retainer plate facing the second retainer plate;
   a plurality of second spring supporters installed on a surface of the second retainer plate facing the first retainer plate; and
   a plurality of coil springs supported by the first spring supporters and the second spring supporters.

3. The lock-up device of the torque converter of claim 2, wherein
   the inner gear is installed close to the exterior circumference of the first retainer plate.

4. The lock-up device of the torque converter of claim 2, wherein
   an outer circumference portion of the second retainer plate is shaped to be bent outward toward the side of the input side clutch supporter and is in contact with the input side clutch supporter on a narrow surface.

5. The lock-up device of the torque converter of claim 2, wherein
   a plurality of rivets for fixing the first retainer plate and the lock-up piston are included and the coil springs are not disposed near a fixing position of the rivets.

6. The lock-up device of the torque converter of claim 2, wherein
   a plurality of hole portions installed to the first retainer plate as a part of the spring pack and a plurality of extrusion rivets where a part of the lock-up piston is protruded in a spring pack direction are included, and the extrusion rivets configured to be inserted into the hole portions of the first retainer plate.

7. The lock-up device of the torque converter of claim 6, wherein
   the coil springs are not disposed near a position of the extrusion rivets of the lock-up piston which is inserted into the hole portions of the first retainer plate.

8. The lock-up device of the torque converter of claim 1, wherein
   an outer circumference portion of the lock-up piston is bent to an output side of an axis direction and supported by the piston guide at the outer circumference portion.

* * * * *